United States Patent
Chou et al.

(10) Patent No.: US 7,764,450 B2
(45) Date of Patent: Jul. 27, 2010

(54) LENS ACTUATOR

(75) Inventors: Tai-Hsu Chou, Taipei Hsien (TW); Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/257,791

(22) Filed: Oct. 24, 2008

(65) Prior Publication Data
US 2009/0262440 A1    Oct. 22, 2009

(30) Foreign Application Priority Data
Apr. 16, 2008    (CN) .................. 2008 1 0301140

(51) Int. Cl.
*G02B 7/02* (2006.01)
(52) U.S. Cl. .................. 359/824; 359/811; 359/819; 359/822
(58) Field of Classification Search .................. 359/811, 359/819, 822–824
See application file for complete search history.

(56) References Cited

U.S. PATENT DOCUMENTS 5,258,797 A * 11/1993 Oyoshi et al. ............... 396/132
5,289,318 A *  2/1994 Sekine et al. ............... 359/813

* cited by examiner

*Primary Examiner*—Jessica T Stultz
*Assistant Examiner*—Mahidere S Sahle
(74) *Attorney, Agent, or Firm*—Andrew C. Cheng

(57) ABSTRACT

A lens actuator includes a lens barrel for accommodating the lens, a coil wrapped around the lens barrel, a plurality of magnets, a bracket, and a resilient plate. The bracket is configured for mounting the magnets thereon and accommodating the lens barrel therein. The resilient plate is connected between the bracket and the lens barrel to hold the lens barrel on the bracket. The bracket includes two ring shaped members parallel to each other, a plurality of supporting rods, and a plurality of magnet mounting holes. The supporting rods are interconnected between the two ring-shaped members. Each two neighboring supporting rods have one of the magnets mounted therebetween.

12 Claims, 4 Drawing Sheets

LENS ACTUATOR

CROSS REFERENCE TO RELATED APPLICATION

This application is related to a commonly-assigned copending application Ser. No. 12/192,376, entitled "resilient plate and lens actuator with same". Disclosures of the above-identified application are incorporated herein by reference in its entirety.

BACKGROUND

1. Technical Field

The present invention relates to lens actuators, and particularly, to a voice coil motor type lens actuator and a resilient plate in the actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, what is needed is a lens actuator adapted for driving the lenses with more compact structure and less mechanical movement.

SUMMARY

A lens actuator includes a lens barrel for accommodating the lens, a coil wrapped around the lens barrel, a plurality of magnets, a bracket, and a resilient plate. The bracket is configured for mounting the magnets thereon and accommodating the lens barrel therein. The resilient plate is connected between the bracket and the lens barrel to hold the lens barrel on the bracket. The bracket includes two ring shaped members parallel to each other, a plurality of supporting rods, and a plurality of magnet mounting holes. The supporting rods are interconnected between the two ring-shaped members. Each two neighboring supporting rods have one of the magnets mounted therebetween.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Figure 1:
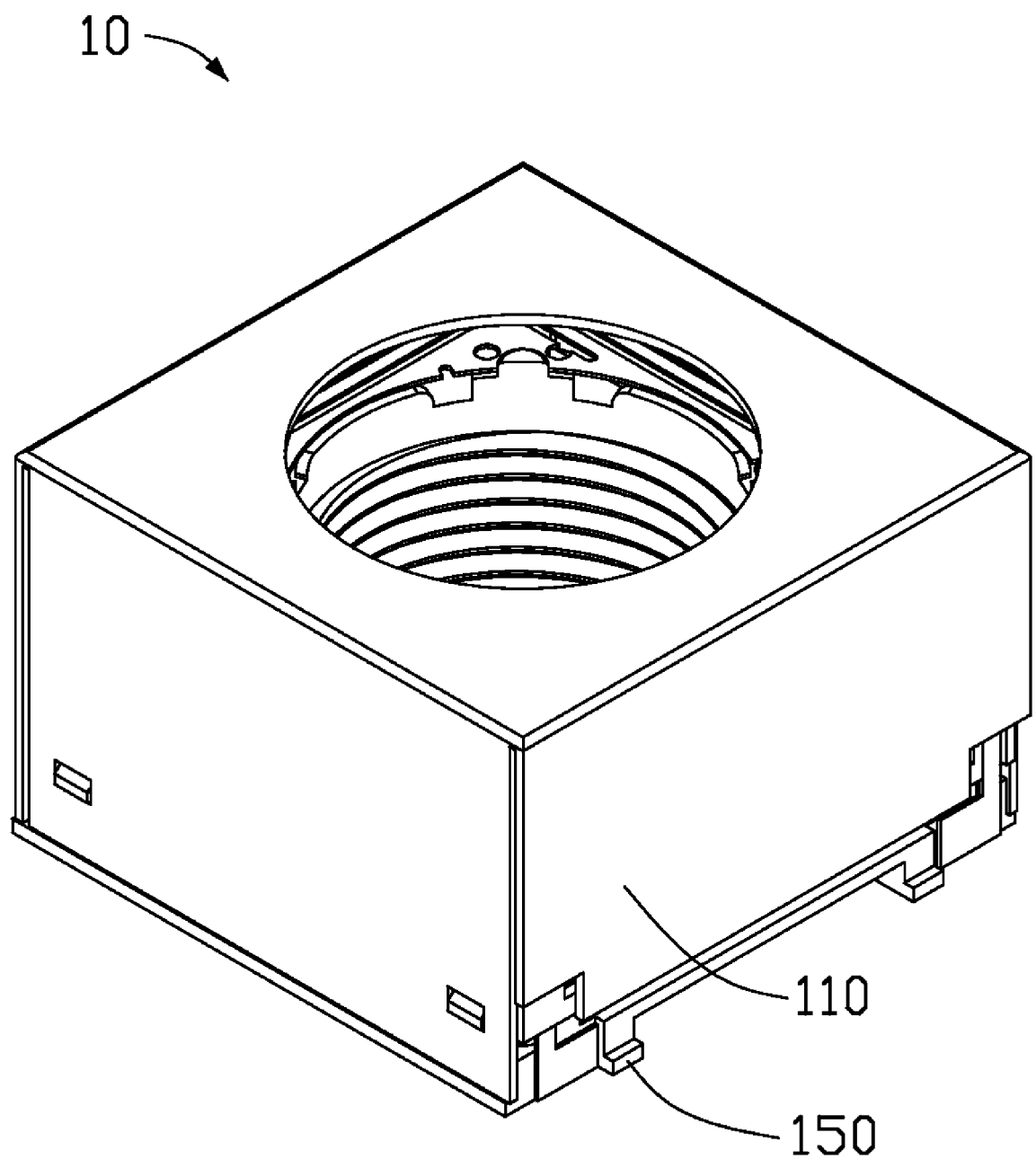
FIG. 1 is a schematic, isometric view of a lens actuator according to a present embodiment.
Figure 2:
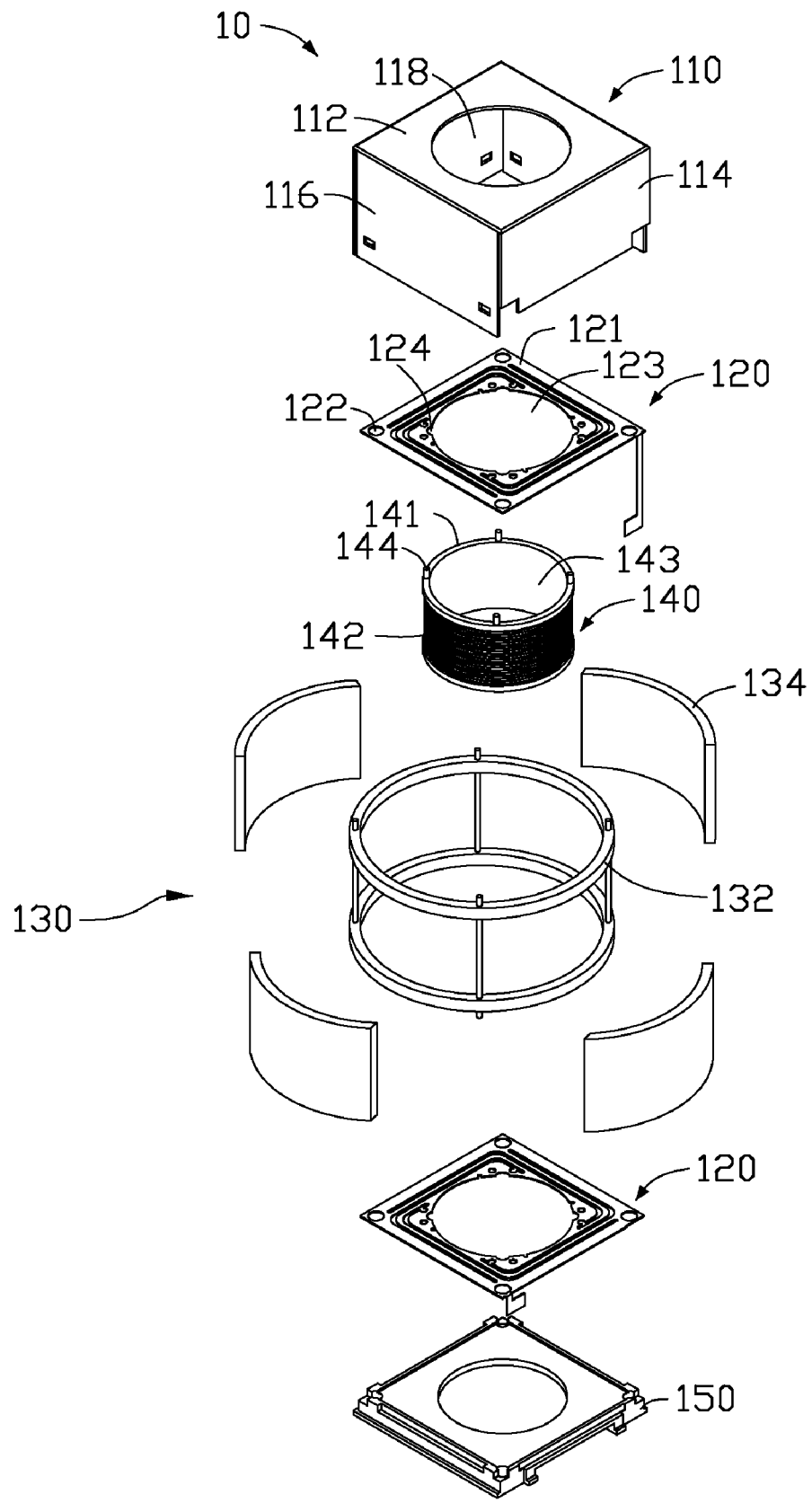
FIG. 2 is an exploded view of the lens actuator in FIG. 1, the lens actuator including a bracket.

Referring to FIGS. 1 and 2, a lens actuator 10, in accordance with a present embodiment, includes a housing 110, a fixed unit 130, a movable unit 140, two resilient plates 120, and a board 150.

The housing 110 includes a panel 112, a through hole 118 defined in the center of the panel 112, two opposite first peripheral panels 114 and two opposite second peripheral panels 116 respectively perpendicularly extending from four sides of the panel 112 and fastened to one another by use of dovetail panel joints (not shown). The panel 112, the first peripheral panels 114, and the second peripheral panels 116 cooperatively define a cavity for accommodating the fixed unit 130. It is understood that the housing 110 also can be cylinder shaped. The housing 110 is made of an electromagnetic shielding material, such as nickel alloy, conductive plastic, surface conductive material, conductive glass, etc.

Figure 3:
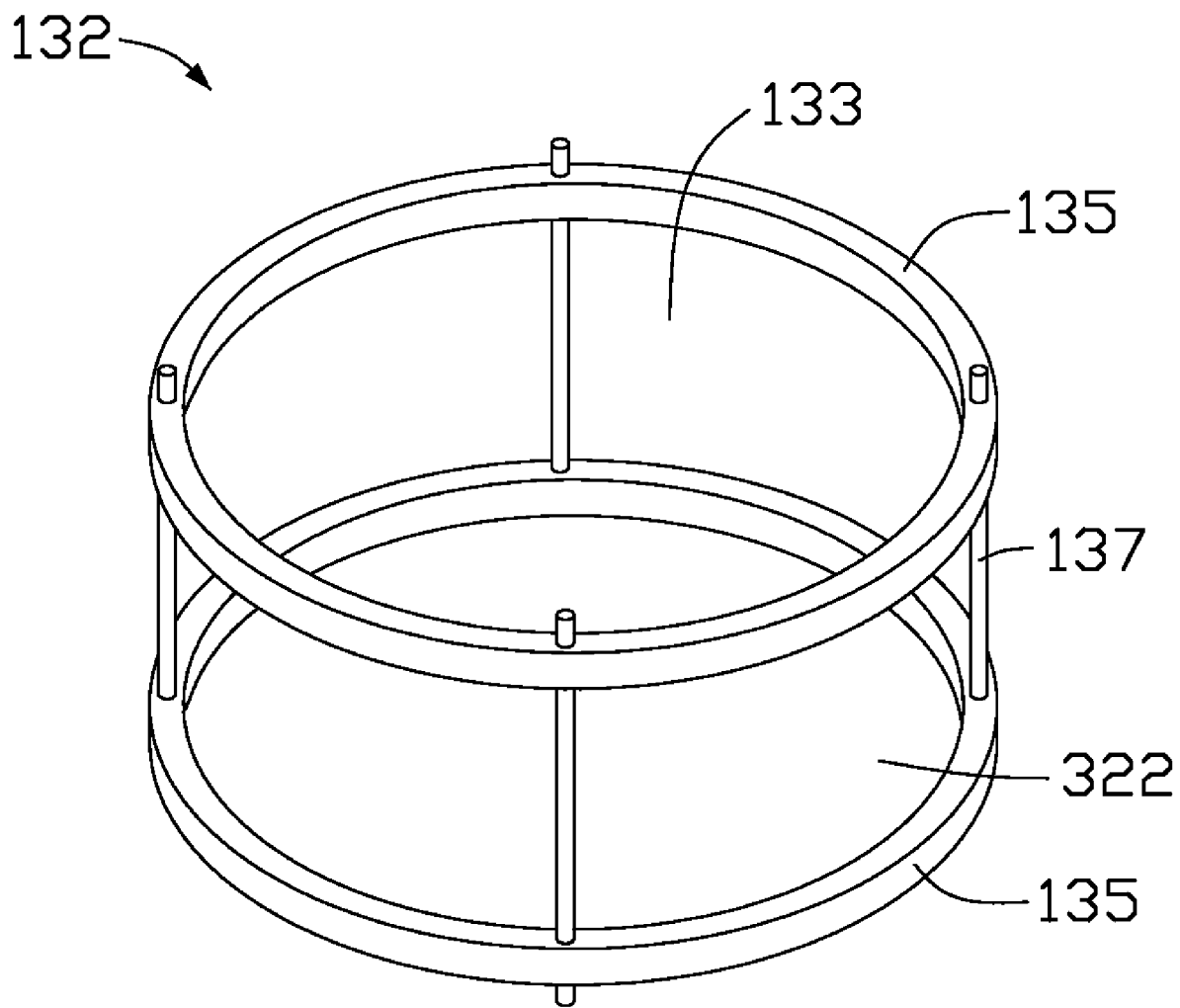
FIG. 3 is a schematic, isometric view of the bracket in FIG. 2, the bracket including a plurality of supporting rods.

Referring to FIGS. 2 and 3, the fixed unit 130 includes a substantially cylinder shaped bracket 132 and a plurality of substantially circular-arc shaped magnets 134. The bracket 132 is receivable in the housing 110. A first accommodating room 133 is defined in the bracket 132 for receiving the movable unit 140 therein.

The bracket 132 includes at least two substantially ring shaped members 135 of same shape and size. The two substantially ring shaped members 135 are arranged parallel and coaxial with each other. A plurality of supporting rods 137 are connected between the two substantially ring shaped members 135, thereby a plurality of magnet mounting holes 322 being defined between the two substantially ring shaped members 135. In the present embodiment, the number of the supporting rods 137 is four. The number of the magnets 134 corresponds to that of the magnet mounting holes 322. The magnet mounting holes 322 are in communication with the first accommodating room 133. Each circular-arc shaped magnet 134 can be matingly mounted in the corresponding magnet mounting hole 322.

Figure 4:
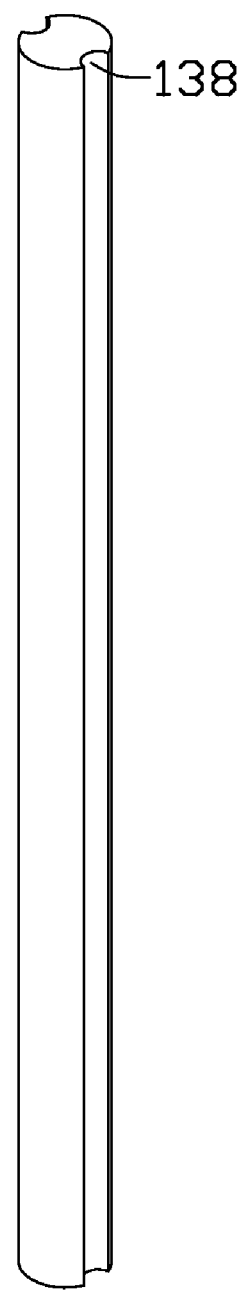
FIG. 4 is a schematic, isometric view of the supporting rod in FIG. 3.

Referring to FIG. 4, two gluing grooves 138 are defined in the cylindrical surface of the supporting rod 137 each facing a corresponding one of the two neighboring magnets 134. The gluing grooves 138 are configured for receiving adhesive for adhering the magnets 134 to the cylinder shaped bracket 132, and preventing or minimizing the amount of adhesive infiltrating into the bracket 132. Four supporting rods 137 are respectively vertically protruded from the top and bottom sides of the bracket 132. Distal ends of the supporting rods 137 are configured for fastening the fixed unit 130 to one of the resilient plates 120.

Referring to FIG. 2, the movable unit 140 includes a lens barrel 141 and coils 142. The movable unit 140 is accommodated in the first accommodating room 133 (refer to FIG. 3) of the bracket 132. The lens barrel 141 defines a second accommodating room 143 for accommodating the lenses and filters (not shown). The second accommodating room 143 is a through hole. Four positioning pins 144 protrude from the top surface and bottom surface of the lens barrel 141. The coils 142 are wrapped around the sidewall of the lens barrel 141.

The resilient plate 120 comprises a plate shaped body 121. In the present embodiment, the plate shaped body 121 is substantially square shaped. The plate shaped body 121 can also be circular. A second through hole 123 for light passing therethrough is defined at the center of the plate shaped body 121.

Cutouts or through holes 124 are defined in the edge of the second through hole 123 corresponding to the positioning pins 144 of the lens barrel 141. The resilient plates 120 are fastened to the top or bottom side of the lens barrel 141 by engagement of the cutouts or through holes 124 with the respective positioning pins 144. Four holes 122, each corresponding to one of the supporting rods 137 are defined in the peripheral portion of the plate shaped body 121. The resilient plates 120 are fastened to the top or bottom side of the bracket 132 by engagement of the holes 122 with the corresponding distal ends of the supporting rods 137.

The board 150 is fastened to the distal ends of the supporting rods 137 at the top side of the bracket 132.

When an electric current is applied to the coils 142, the coils 142 are excited to act upon the magnets 134, thereby producing a magnetic force to drive the lens barrel 141 to move between the resilient plates 120.

When electric current is cut off from the coils 142, the resilient plates 120 impart a pressure to the lens barrel 141 relative to the bracket 132, thereby returning the lens barrel 141 to its former position.

Further, the housing 110 and the board 150 protect the lens barrel and image sensor (not shown) against dust.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens actuator, comprising:
a lens barrel for accommodating the lens, a coil wrapped around the lens barrel, a plurality of magnets, a bracket for mounting the magnets therein and accommodating the lens barrel therein, and a resilient plate connected between the bracket and the lens barrel to hold the lens barrel in the bracket,
wherein the bracket comprises two substantially ring shaped members substantially parallel and coaxial with each other, and a plurality of supporting rods interconnected between the two ring shaped members, the two ring-shaped members have a same inner diameter and a same outer diameter, each two neighboring supporting rods have one of the magnets mounted therebetween.

2. The lens actuator as claimed in claim 1, wherein the resilient plate comprises a first through hole defined in a center thereof.

3. The lens actuator as claimed in claim 2, wherein the resilient plate further comprises a plurality of cutouts defined in the edge of the first through hole.

4. The lens actuator as claimed in claim 3, wherein the lens barrel comprises a plurality of positioning pins corresponding to the cutouts and protruded out from the lens barrel, and the resilient plate is fastened to the lens barrel by engagement of the cutouts with the respective positioning pins.

5. The lens actuator as claimed in claim 1, wherein distal ends of each of the supporting rods are protruded out from the ring shaped members.

6. The lens actuator as claimed in claim 5, wherein the resilient plate further comprises a plurality of second through holes defined in the periphery portion thereof corresponding to the supporting rods, and the resilient plate is fastened to the bracket by engagement of the second through holes with the respective distal ends of the supporting rods.

7. The lens actuator as claimed in claim 1, wherein each of the supporting rods comprises a groove defined along a lengthwise direction thereof, the grooves facing the respective magnets and configured for receiving an adhesive to adhere the magnets to the respective supporting rods.

8. A lens actuator, comprising:
a lens barrel for accommodating the lens, the lens barrel having a coil wrapped around,
a hollow cylindrical bracket, the bracket comprising two ring shaped members of a same size, and a plurality of supporting rods interconnecting the two ring shaped members, the two ring shaped members cooperatively defining an accommodating room for movably accommodating the lens barrel therein, each two adjacent supporting rods defining a magnet mounting hole therein;
a plurality of circular-arc shaped magnets mounted in the respective magnet mounting holes, the supporting rods and the magnets cooperatively forming an annular sidewall of the bracket; and
a first resilient plate and a second resilient plate located on a top and a bottom side of both the bracket and lens barrel, respectively, the first and second resilient plates connecting the bracket and the lens barrel.

9. The lens actuator as claimed in claim 8, wherein the ring shaped members are substantially parallel and coaxial with each other.

10. The lens actuator as claimed in claim 8, wherein each of the supporting rods comprises two grooves defined along a lengthwise direction thereof, the grooves facing the respective magnets and configured for receiving an adhesive to adhere the magnets to the respective supporting rods.

11. The lens actuator as claimed in claim 10, wherein the resilient plate comprises a first through hole defined in a center thereof, and a plurality of cutouts defined in an edge of the first through hole; the lens barrel comprises a plurality of positioning pins corresponding to the cutouts and protruded out from the lens barrel, and the resilient plate is fastened to the lens barrel by engagement of the cutouts with the respective positioning pins.

12. The lens actuator as claimed in claim 10, wherein distal ends of each of the supporting rods protrudes out from the ring shaped members; the resilient plate further comprises a plurality of second through holes defined in the periphery portion thereof corresponding to the supporting rods, and the resilient plate is fastened to the bracket by engagement of the second through holes with the respective distal ends of the supporting rods.

* * * * *